US010817896B2

(12) United States Patent
Winner et al.

(10) Patent No.: US 10,817,896 B2
(45) Date of Patent: Oct. 27, 2020

(54) MEASURING CONVERSION OF AN ONLINE ADVERTISING CAMPAIGN INCLUDING GROUP OFFERS FROM AN OFFLINE MERCHANT

(75) Inventors: Jeffrey Winner, Los Altos, CA (US); Geraud Boyer, San Francisco, CA (US); Amit Kumar, Palo Alto, CA (US); Eckart Walther, Palo Alto, CA (US)

(73) Assignee: CARDSPRING, LLC, San Francisco, CA (US)

( * ) Notice: Subject to any disclaimer, the term of this patent is extended or adjusted under 35 U.S.C. 154(b) by 1212 days.

(21) Appl. No.: 13/211,253

(22) Filed: Aug. 16, 2011

(65) Prior Publication Data
US 2012/0209672 A1 Aug. 16, 2012

Related U.S. Application Data

(60) Provisional application No. 61/442,943, filed on Feb. 15, 2011, provisional application No. 61/442,691, filed on Feb. 14, 2011.

(51) Int. Cl.
*G06Q 30/02* (2012.01)

(52) U.S. Cl.
CPC ......... *G06Q 30/0246* (2013.01); *G06Q 30/02* (2013.01); *G06Q 30/0273* (2013.01)

(58) Field of Classification Search
USPC ...... 705/14.1, 39, 7.29, 14.17, 14.25, 14.66, 705/14.23, 14.53, 44, 14.13, 14.35, 14.36, 705/14.38, 14.39, 14.49, 14.54, 14.58, 705/14.64, 14.65, 14.69, 1.1, 26.1, 30; 235/380
See application file for complete search history.

(56) References Cited

U.S. PATENT DOCUMENTS

| 5,175,415 A | 12/1992 | Guest |
| 5,175,416 A | 12/1992 | Mansvelt et al. |
| RE36,788 E | 7/2000 | Mansvelt et al. |
| 6,138,107 A | 10/2000 | Elgamal |
| 6,169,975 B1 | 1/2001 | White et al. |
| 6,298,330 B1 | 10/2001 | Gardenswartz et al. |

(Continued)

FOREIGN PATENT DOCUMENTS

WO    2008067543 A2    6/2008

OTHER PUBLICATIONS

Hash Function https://en.wikipedia.org/wiki/Hash_function, Feb. 28, 2008, Wikipedia (Year: 2008).*

(Continued)

*Primary Examiner* — Katherine Kolosowski-Gager
(74) *Attorney, Agent, or Firm* — Smith Baluch LLP

(57) ABSTRACT

A technique for tracking conversion of an online offer includes tracking online and/or offline transactions. A customer accepts an offer provided by a merchant and submits his or her account information so that he or she may receive a reward for satisfying criteria associated with the offer. Transactions of the merchant are then monitored at the payment processor level to determine whether the customer satisfies the purchase criteria. Therefore, online and offline conversion can both be tracked. Further, the merchant is able to determine the overall effectiveness of advertising campaigns by analyzing the number of offers that are both accepted and satisfied.

24 Claims, 9 Drawing Sheets

(56) References Cited

U.S. PATENT DOCUMENTS

| | | | |
|---|---|---|---|
| 6,332,126 | B1 | 12/2001 | Peirce et al. |
| 6,505,168 | B1 | 1/2003 | Rothman et al. |
| 6,606,606 | B2 | 8/2003 | Starr |
| 7,035,855 | B1 | 4/2006 | Kilger et al. |
| 7,444,658 | B1 | 10/2008 | Matz et al. |
| 7,668,785 | B1 | 2/2010 | Hammad |
| 7,677,450 | B1 | 3/2010 | Rajewski |
| 7,698,269 | B2 | 4/2010 | Zhou et al. |
| 7,729,940 | B2 | 6/2010 | Harvey et al. |
| 7,734,502 | B1 | 6/2010 | Yehoshua et al. |
| 7,797,233 | B2 | 9/2010 | Sobek |
| 8,000,933 | B1 | 8/2011 | Poeltl et al. |
| 8,112,301 | B2 | 2/2012 | Harvey et al. |
| 8,131,594 | B1 | 3/2012 | Yehoshua et al. |
| 8,135,647 | B2 | 3/2012 | Hammad et al. |
| 8,244,584 | B1 | 8/2012 | O'Shea et al. |
| 8,335,739 | B1 | 12/2012 | Bol et al. |
| 8,421,663 | B1 | 4/2013 | Bennett |
| 8,620,738 | B2 | 12/2013 | Fordyce, I et al. |
| 8,626,579 | B2 | 1/2014 | Fordyce, I et al. |
| 8,630,200 | B2 | 1/2014 | St Jean et al. |
| 8,661,161 | B2 | 2/2014 | Zhang |
| 9,268,750 | B2 | 2/2016 | Lansford et al. |
| 9,411,900 | B2 | 8/2016 | Vishria et al. |
| 9,412,102 | B2 | 8/2016 | Wolf et al. |
| 9,430,773 | B2 | 8/2016 | Aloni et al. |
| 9,477,771 | B2 | 10/2016 | Aoki et al. |
| 9,613,361 | B2 | 4/2017 | Wolf et al. |
| 9,841,282 | B2 | 12/2017 | VonDerheide et al. |
| 2002/0016774 | A1 | 2/2002 | Pendlebury |
| 2002/0107986 | A1 | 8/2002 | Pfohe et al. |
| 2002/0120530 | A1 | 8/2002 | Sutton et al. |
| 2003/0040363 | A1 | 2/2003 | Sandberg |
| 2003/0061093 | A1 | 3/2003 | Todd |
| 2003/0097297 | A1 | 5/2003 | Cavarretta et al. |
| 2003/0155903 | A1 | 8/2003 | Gauthier et al. |
| 2003/0158844 | A1 | 8/2003 | Kramer et al. |
| 2003/0172145 | A1 | 9/2003 | Nguyen |
| 2003/0216990 | A1 | 11/2003 | Star |
| 2004/0177037 | A1 | 9/2004 | Lee |
| 2004/0230536 | A1 | 11/2004 | Fung et al. |
| 2005/0055275 | A1 | 3/2005 | Newman et al. |
| 2005/0075932 | A1 | 4/2005 | Mankoff |
| 2006/0085357 | A1 | 4/2006 | Pizarro |
| 2006/0149671 | A1 | 7/2006 | Nix et al. |
| 2006/0212355 | A1 | 9/2006 | Teague et al. |
| 2006/0273831 | A1 | 12/2006 | Maksimovic et al. |
| 2007/0027757 | A1 | 2/2007 | Collins et al. |
| 2007/0073585 | A1* | 3/2007 | Apple et al. ............... 705/14 |
| 2007/0124500 | A1 | 5/2007 | Bedingfield et al. |
| 2007/0136279 | A1 | 6/2007 | Zhou et al. |
| 2008/0010120 | A1 | 1/2008 | Chung et al. |
| 2008/0046314 | A1 | 2/2008 | Chung et al. |
| 2008/0059306 | A1 | 3/2008 | Fordyce et al. |
| 2008/0059329 | A1* | 3/2008 | Luchene et al. ............ 705/26 |
| 2008/0065474 | A1 | 3/2008 | Sharma et al. |
| 2008/0065490 | A1 | 3/2008 | Novick et al. |
| 2008/0147550 | A1 | 6/2008 | Morsillo et al. |
| 2008/0147552 | A1 | 6/2008 | Morsillo et al. |
| 2008/0167017 | A1 | 7/2008 | Wentker et al. |
| 2008/0195579 | A1 | 8/2008 | Kennis et al. |
| 2008/0217397 | A1 | 9/2008 | Degliantoni et al. |
| 2008/0235351 | A1 | 9/2008 | Banga et al. |
| 2008/0300984 | A1 | 12/2008 | Li |
| 2009/0043696 | A1 | 2/2009 | Ornce et al. |
| 2009/0070583 | A1 | 3/2009 | Mueller et al. |
| 2009/0072026 | A1 | 3/2009 | Lee et al. |
| 2009/0100099 | A1 | 4/2009 | Buckwalter |
| 2009/0132366 | A1 | 5/2009 | Lam et al. |
| 2009/0164315 | A1 | 6/2009 | Rothman |
| 2009/0191962 | A1* | 7/2009 | Hardy et al. ............... 463/29 |
| 2009/0216579 | A1 | 8/2009 | Zen et al. |
| 2009/0228365 | A1 | 9/2009 | Tomchek et al. |
| 2009/0271317 | A1* | 10/2009 | Walker et al. ............... 705/51 |
| 2010/0063903 | A1 | 3/2010 | Whipple et al. |
| 2010/0075638 | A1 | 3/2010 | Carlson et al. |
| 2010/0114686 | A1 | 5/2010 | Carlson et al. |
| 2010/0262484 | A1 | 10/2010 | Bardin et al. |
| 2010/0268611 | A1 | 10/2010 | Reid et al. |
| 2010/0274650 | A1 | 10/2010 | Kantor et al. |
| 2010/0299194 | A1 | 11/2010 | Snyder et al. |
| 2010/0306040 | A1 | 12/2010 | Arumugam et al. |
| 2010/0332304 | A1* | 12/2010 | Higgins et al. ............ 705/14.16 |
| 2011/0029367 | A1 | 2/2011 | Olson et al. |
| 2011/0029396 | A1 | 2/2011 | Sobek |
| 2011/0057027 | A1 | 3/2011 | Grossman et al. |
| 2011/0066497 | A1 | 3/2011 | Gopinath et al. |
| 2011/0087531 | A1* | 4/2011 | Winters ............... G06Q 20/10 |
| | | | 705/14.17 |
| 2011/0099108 | A1 | 4/2011 | Fung et al. |
| 2011/0106840 | A1 | 5/2011 | Barrett et al. |
| 2011/0125565 | A1 | 5/2011 | MacIlwaine et al. |
| 2011/0125593 | A1 | 5/2011 | Wright et al. |
| 2011/0137740 | A1 | 6/2011 | Bhattacharya et al. |
| 2011/0161149 | A1 | 6/2011 | Kaplan |
| 2011/0225033 | A1* | 9/2011 | Schmeyer ............ G06Q 10/02 |
| | | | 705/14.32 |
| 2011/0231224 | A1 | 9/2011 | Winters |
| 2011/0231258 | A1* | 9/2011 | Winters ............... G06Q 30/02 |
| | | | 705/14.53 |
| 2011/0246369 | A1 | 10/2011 | de Oliveira et al. |
| 2011/0264499 | A1 | 10/2011 | Abendroth et al. |
| 2011/0289434 | A1 | 11/2011 | Kieft |
| 2011/0295990 | A1 | 12/2011 | St Jean et al. |
| 2011/0302022 | A1* | 12/2011 | Fordyce et al. ............ 705/14.35 |
| 2012/0035997 | A1 | 2/2012 | Burgess et al. |
| 2012/0047008 | A1 | 2/2012 | Alhadeff et al. |
| 2012/0060108 | A1 | 3/2012 | Domartini |
| 2012/0075137 | A1 | 3/2012 | Tanizawa |
| 2012/0084135 | A1 | 4/2012 | Nissan et al. |
| 2012/0095819 | A1 | 4/2012 | Li |
| 2012/0143705 | A1 | 6/2012 | Bhattacharya et al. |
| 2012/0150669 | A1 | 6/2012 | Langley et al. |
| 2012/0166272 | A1 | 6/2012 | Wiley et al. |
| 2012/0203604 | A1 | 8/2012 | Baker et al. |
| 2012/0203929 | A1 | 8/2012 | Patalsky |
| 2012/0209672 | A1 | 8/2012 | Winner et al. |
| 2012/0209695 | A1 | 8/2012 | Winner et al. |
| 2012/0209696 | A1 | 8/2012 | Winner et al. |
| 2012/0209771 | A1 | 8/2012 | Winner et al. |
| 2012/0215610 | A1* | 8/2012 | Amaro ............... G06Q 30/02 |
| | | | 705/14.23 |
| 2012/0271770 | A1* | 10/2012 | Harris ............... G06Q 20/00 |
| | | | 705/67 |
| 2012/0284105 | A1 | 11/2012 | Li |
| 2012/0316941 | A1 | 12/2012 | Moshfeghi |
| 2013/0143533 | A1 | 6/2013 | Carlson et al. |
| 2013/0159233 | A1 | 6/2013 | Mason et al. |
| 2013/0218652 | A1 | 8/2013 | Fargo et al. |
| 2013/0227662 | A1 | 8/2013 | Crampton |
| 2013/0282592 | A1 | 10/2013 | Zambrana et al. |
| 2013/0290821 | A1 | 10/2013 | Pollack |
| 2014/0129733 | A1 | 5/2014 | Klais et al. |
| 2014/0156407 | A1 | 6/2014 | Dinardo, Sr. et al. |
| 2014/0372325 | A1 | 12/2014 | Zambrana et al. |
| 2015/0025981 | A1 | 1/2015 | Zaretsky et al. |
| 2015/0186930 | A1 | 7/2015 | Winner et al. |
| 2015/0332365 | A1 | 11/2015 | Kassemi et al. |
| 2015/0370899 | A1 | 12/2015 | Jung |
| 2016/0267060 | A1 | 9/2016 | Skirpa et al. |
| 2016/0277315 | A1 | 9/2016 | Miller et al. |
| 2016/0308936 | A1 | 10/2016 | Yuan |
| 2017/0034013 | A1 | 2/2017 | Cherian et al. |
| 2017/0178223 | A1 | 6/2017 | Ranasinghe et al. |
| 2017/0289350 | A1 | 10/2017 | Philbin et al. |

OTHER PUBLICATIONS

Steinfeld, Charles et al: Click and Mortar Strategies Viewed from the Web: A content analysis of Features illustrating integration between Retailers' Online and Offline Presence. Electronic Markets, vol. 15, No. 3. Available at: https://msu.edu/~steinfie/EM_2005.pdf (Year: 2005).*

(56) References Cited

OTHER PUBLICATIONS

CardSpring, "CardSring Launches New Payment Network Platform That Lets Developers Create Applications for Payment Cards," 2008, pp. 1-3.
Non-Final Office Action from U.S. Appl. No. 13/211,270, dated Oct. 6, 2014.
Non-Final Office Action from U.S. Appl. No. 13/211,265, dated Sep. 12, 2014.
Non-Final Office Action from U.S. Appl. No. 13/211,262, dated Aug. 13, 2014.
Non-Final Office Action from U.S. Appl. No. 13/211,262, dated Jul. 11, 2012.
Final Office Action from U.S. Appl. No. 13/211,262, dated Jan. 31, 2013.
Non-Final Office Action from U.S. Appl. No. 13/211,262, dated Nov. 19, 2013.
Non-Final Office Action from U.S. Appl. No. 13/211,262, dated Mar. 20, 2014.
Response to Non-Final Office Action in U.S. Appl. No. 13/211,270, filed Apr. 6, 2015 14 pp.
Amendment in Response to Office Action dated Oct. 30, 2015, from U.S. Appl. No. 13/211,270, filed Mar. 30, 2016, 13 pp.
Final Office Action from U.S. Appl. No. 13/211,270, dated Oct. 30, 2015, 14 pp.
Final Office Action from U.S. Appl. No. 14/656,555, dated Jun. 28, 2018, 26 pp.
Office Action from U.S. Appl. No. 14/656,555, dated Sep. 1, 2017, 14 pp.
Amendment in Response to Office Action dated Sep. 1, 2017, from U.S. Appl. No. 14/656,555, filed Dec. 19, 2017, 18 pp.
Office Action from U.S. Appl. No. 13/211,270, dated Nov. 15, 2017, 14 pp.
Response to Office Action dated Nov. 15, 2017, from U.S. Appl. No. 13/211,270, filed May 15, 2018, 15 pp.
Amendment in Response to Office Action dated Dec. 21, 2017, from U.S. Appl. No. 13/211,253, filed Jun. 21, 2018, 19 pp.
Appeal Brief in U.S. Appl. No. 12/849,789, filed Apr. 3, 2017,35 pages.
CardSpring, "CardSpring Launches New Payment Network Platform That Lets Developers Create Applications for Payment Cards," Sys-Con Media 2008, 3 pp.
U.S. Appl. No. 14/656,555, filed Mar. 12, 2015 by Jeffrey Winner.
Extended Search Report from European Application No. 15163296.5, dated Sep. 30, 2015, 13 pp.
Non-Final Office Action from U.S. Appl. No. 13/211,253, dated Oct. 3, 2014.
Non-Final Office Action in U.S. Appl. No. 14/656,555 dated Mar. 7, 2019, 24 pp.
Prosecution History from U.S. Appl. No. 13/211,252 from Feb. 13, 2012 to Mar. 3, 2015 32 pp.

* cited by examiner

MEASURING CONVERSION OF AN ONLINE ADVERTISING CAMPAIGN INCLUDING GROUP OFFERS FROM AN OFFLINE MERCHANT

CROSS-REFERENCE TO RELATED APPLICATIONS

This application claims priority benefit to U.S. provisional patent application titled, "SYSTEM AND METHOD IMPLEMENTING REFERRAL PROGRAMS," filed on Feb. 15, 2011, having application Ser. No. 61/442,943 and also claims priority benefit to U.S. provisional patent application titled, "SYSTEM AND METHOD FOR IMPLEMENTING PAYMENT NETWORK COOKIES," filed on Feb. 14, 2011, having application Ser. No. 61/442,691, both of which are incorporated by reference herein.

BACKGROUND

Field of the Invention

The present invention relates to the field of computer software and, in particular, to a system and method for monitoring for transactions.

Description of the Related Art

Online advertising is a form of promotion that uses the internet to deliver marketing messages to potential customers. Examples of online advertising include contextual advertisements on search engine results pages, banner advertisements, rich media (e.g., video) advertisements, social network advertisements, interstitial advertisements, online classified advertisements, e-mail marketing, and many others.

One important aspect of an online advertisement is the online "conversion" of the online advertisement, which refers generally to a customer completing an online transaction with an online merchant in response to viewing the online advertisement. Typically, when a customer views an online advertisement, the customer's activity across one or more web pages is tracked to determine whether a particular online transaction is actually completed by the customer. One example of a tracking technique is referred to as pixel-based tracking, where a 1×1 pixel image—often referred to as a "web beacon"—is linked to an online advertisement and included in each web page of, for example, an online shopping cart. The 1×1 pixel image reports information back to a manager of the online advertisement such that the manager is able to determine whether the customer has reached an order confirmation page, indicating that the online advertisement was successful by resulting in a conversion.

Although many merchants provide their customers the ability to shop online, there exists a large number of merchants that have one or more brick-and-mortar locations, referred to herein as "offline" merchants. Though offline merchants typically do not provide an online shopping cart to their customers, the offline merchants may nonetheless be interested in online advertising that causes customers to visit their brick-and-mortar locations in an attempt to increase sales. Unfortunately, as with offline advertising (e.g., advertising in magazines, TV, radio, etc.), it is difficult for offline merchants to measure the performance of their online advertising campaigns.

One attempt to measure performance of an advertising campaign involves polling customers and asking them to share the motivation for the purchase they are making. For example, if a customer shops at a merchant location during a sale, then the merchant may ask the customer, "Where did you hear about our sale?" Unfortunately, some customers are lazy and do not wish to share such information with the merchant or may provide inaccurate information. Determining the effectiveness of an online portion of ad campaign is further complicated when the same advertisements are presented to potential customers through other channels that are not online.

As the foregoing illustrates, there is a need in the art for an improved technique that overcomes the deficiencies of prior approaches.

SUMMARY

One embodiment of the invention provides a method for tracking conversion of an online offer. The method includes identifying an online offer accepted by a customer; receiving a set of transactions executed at a merchant; parsing the set of transactions to determine that a set of criteria associated with the online offer has been satisfied by the customer via one or more transactions at the merchant; and notifying the merchant that the online offer has been satisfied by the customer.

Another embodiment of the invention provides a method for identifying an identification code corresponding to a merchant. The method includes providing the merchant access to an account; instructing the merchant to execute a transaction using the account; parsing one or more transactions made using the account to identify the transaction; and extracting from the transaction the identification code of the merchant.

Further embodiments of the present invention provide a computer-readable storage medium that includes instructions for causing a computer system to carry out one or more of the methods set forth above.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, several specific details are presented to provide a thorough understanding of embodiments of the invention. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
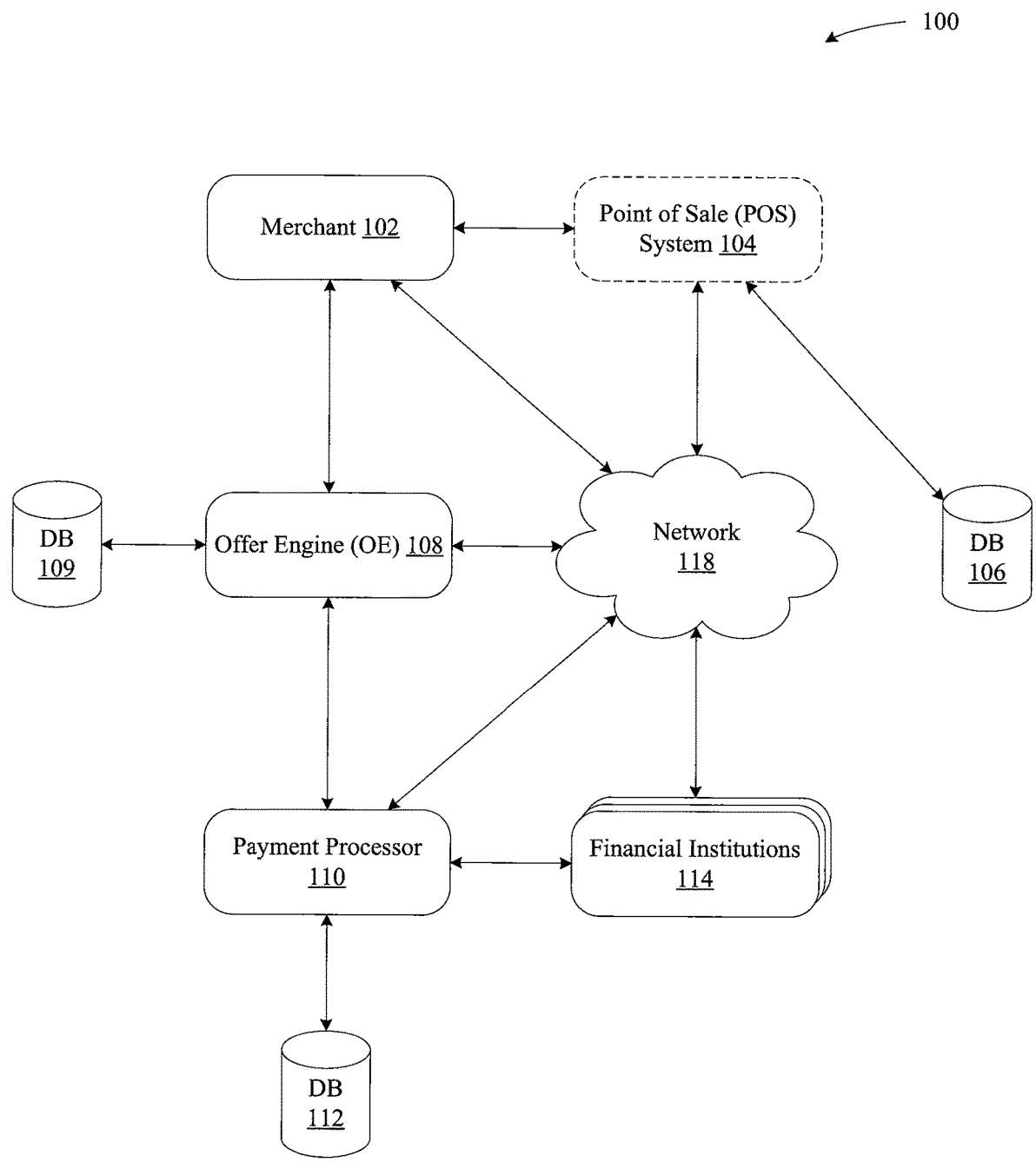
FIG. 1 is a block diagram illustrating components of a system in which embodiments of the invention may be implemented.

FIG. 1 is a block diagram illustrating components of a system 100 in which embodiments of the invention may be implemented. As shown, system 100 includes a merchant 102, a point of sale (POS) system 104 with an associated database 106, an offer engine (OE) 108 with an associated database 109, a payment processor 110 with an associated database 112, one or more financial institutions 114, and a network 118. As shown, merchant 102, OE 108, payment processor 110 and financial institutions 114 communicate with one another via network 108, such as the internet.

Though not illustrated in FIG. 1, each of OE 108, payment processor 110 and POS system 104 include conventional components of a computing device, e.g., a processor, system memory, a hard disk drive, input devices such as a mouse and a keyboard, and output devices such as a monitor.

In one embodiment, DB 106, DB 109 and/or DB 112 can be any type of storage system, e.g., a relational database hosted on a network file system (NFS) device, a storage system hosted by a cloud service provider, and the like. Alternatively, DB 106, DB 109 and/or DB 112 may be integrated in POS system 104, OE 108 and payment processor 110, respectively, such as a database hosted on a local disk and managed by an operating system.

Merchant 102 may be a brick-and-mortal physical merchant, an online merchant, a mail-order/telephone-order (MOTO) merchant, and the like. Merchant 102 is capable of processing accounts of customers when they pay for goods or services offered by merchant 102. Such accounts include credit cards, debit cards, prepaid cards, and the like. In some embodiments, merchant 102 is equipped with POS system 104. As shown, POS system 104 is coupled to database 106, which enables POS system 104 to store detailed information associated with transactions between merchant 102 and customers of merchant 102.

A transaction may be initiated at merchant 102 according to a variety of techniques. For example, a cashier at merchant 102 may swipe a credit card through a card reader included in POS system 104. Alternatively, an account may be delivered virtually on a customer's mobile device, which enables a customer at merchant 102 to wave his/her mobile device in front of a contactless card reader included in POS system 104. Further, the customer may show his/her mobile device to a cashier at merchant 102 who manually enters an account number of the account being used by the customer. Alternatively, the mobile device may include a contactless chip or tag that is wireless-readable by POS system 104 using, e.g., near-field-communication (NFC) technology.

Payment processor 110, in conjunction with financial institutions 114, facilitates payment transactions between merchant 102 and customers thereof, and stores the transactions in DB 112. More specifically, when a customer attempts to pay for goods and/or services offered by merchant 102 using his or her account, a POS terminal submits the transaction through a merchant account to an acquiring bank of the merchant (i.e., one of the financial institutions 114). The acquiring bank then transmits a request for funds through the payment processor 110. The payment processor 110 routes the request for funds to the card holder's issuing bank (i.e., the appropriate financial institution 114) for authorization based on a type of the account. The issuing bank verifies the card number, the transaction type, and the amount. In some examples, the issuing bank then reserves that amount of the cardholder's credit limit for the merchant.

For example, if payment processor 110 detects that the account is a debit card associated with a checking account of the customer, then payment processor 110 routes the transaction request to the bank that issued the debit card, whereupon the issuing bank indicates to payment processor 110 whether the checking account possesses sufficient funds to satisfy the transaction request. In turn, payment processor 110 indicates to the merchant acquiring bank whether the request is for funds has been approved. If the transaction is successfully processed, then funds are transferred from the card holder's account at the issuing bank to the merchant account at the inquiring bank.

An Offer Engine (POE) 108 is configured to determine the effectiveness of advertising campaigns requested and managed by merchant 102. As shown in FIG. 1, OE 108 is in communication with both merchant 102 and payment processor 110. OE 108 manages "offers" that are advertised to, possibly accepted by, and possibly satisfied by customers of merchant 102. The offer can be coupled to a reward that is given to the customer when he or she has satisfied the offer, e.g., cash-back rewards, credit card rewards, store credit, virtual currency, and the like.

An offer may be any offer that involves a customer completing a transaction according to specific criteria, such as buying a certain amount of a product, spending a certain amount in one purchase, making a purchase at a particular time, making a number of purchases within a particular amount of time, and the like. Offers may also involve a group of customers completing a transaction according to specific criteria. As is described in greater detail herein, OE 108 is configured to monitor for transactions to determine whether the criteria for a particular offer have been satisfied. As is also described herein, OE 108 can monitor both online and offline transactions to determine whether the criteria for a particular offer have been satisfied.

Offer data is stored in database 109 accessed by OE 108. The offer data is advertised to customers via webpage advertisements, email marketing campaigns, short-message-service (SMS) messages, telemarketing campaigns, and the like, as described herein. As described below in conjunction with FIG. 2, OE 108 provides an interface that enables customers (e.g., individuals) to register an account with OE 108, including their account information, and subsequently accept and complete offers. OE 108 subsequently monitors transactions initiated at merchant 102 (i.e., online and/or offline) to determine whether offers are satisfied by the customers whom accepted them.

Figure 2:
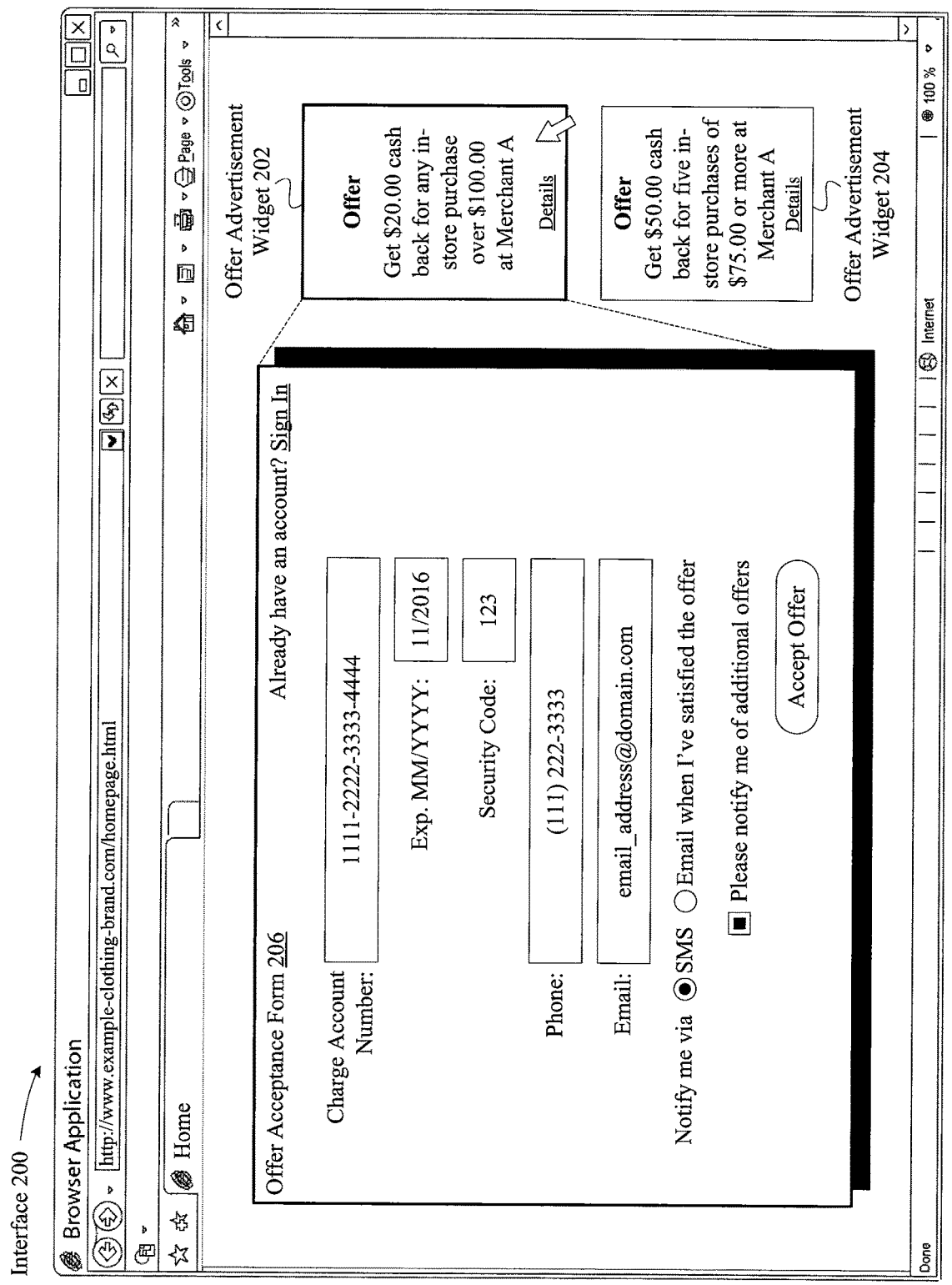
FIG. 2 is a screenshot of an interface configured to gather customer data from a customer that accepts an offer, according to one embodiment of the invention.

FIG. 2 is a screenshot of an interface 200 configured to gather customer data from a customer that accepts an offer, according to one embodiment of the invention. As shown, interface 200 is accessible via a web browser application and includes offer advertisement widget 202, offer advertisement widget 204, and offer acceptance form 206. Offer advertisement widgets 202, 204, when selected by a customer (e.g., by clicking on them) enable a customer to accept offers provided by merchant 102 (e.g., "Merchant A"). For example, the customer may accept the offer advertised in offer advertisement widget 202 to receive a $20.00 cash back reward for any in-store purchase over $100.00 at Merchant A. Similarly, the customer may also accept the offer advertised in offer advertisement widget 204 to receive a $50.00 cash back reward after performing five in-store purchases, each being $75.00 or more, at a physical location of merchant A.

When an offer advertisement widget, such as offer advertisement widget 202 or 204, is selected by a customer, an offer acceptance form 206 is caused to be displayed within interface 200. The customer then enters a variety of information that is subsequently used by OE 108 to determine whether the customer eventually satisfies the offer, as described in further detail below. The customer enters the details of one or more accounts, including account number, expiration date, security code, billing address, etc.

In some embodiments, the customer may optionally submit his or her phone number and/or email address to receive additional offer notifications from OE 108. When the customer provides a phone number and subsequently satisfies an offer, OE 108 may send an SMS message to the phone number with a message indicating that the offer has been satisfied. OE 108 may, in some embodiments, provide another offer to the customer for acceptance by the customer via SMS.

Additionally, the customer may submit his or her information by providing to OE 108 credentials that link to an existing online account hosted by an alternative online service, e.g., a Facebook account or an Oauth account. In particular, OE 108 accesses the online account using the credentials and retrieves the required information, thereby reducing the amount of input required by the customer.

Additionally, the customer may opt to create a customer account with OE 108 when accepting, for example, an offer for the first time. In one example, the customer opts to create a customer account by clicking on a checkbox titled "Create Account" (not shown) and included in offer acceptance form 206, which causes a password input field to appear. Subsequently, and upon providing valid inputs to OE 108 when accepting the offer, OE 108 generates a customer account for the customer and stores the customer account in DB 109. In one example, the customer's email address is assigned as a login ID and is tied to the password that is input by the customer. In this way, when the customer accepts additional offers, he or she is only required to input his or her email address and password by, for example, clicking the "Sign In" link included in offer acceptance form 206. In this way, the customer is able to recall his or her account information and is not required to redundantly provide his or her account information each time he or she accepts an offer.

Though not illustrated in FIG. 2, the customer may associate one or more of his or her account numbers with his or her account. Thus, the OE 108 can track transactions made using any one of the one or more accounts.

Figure 3:
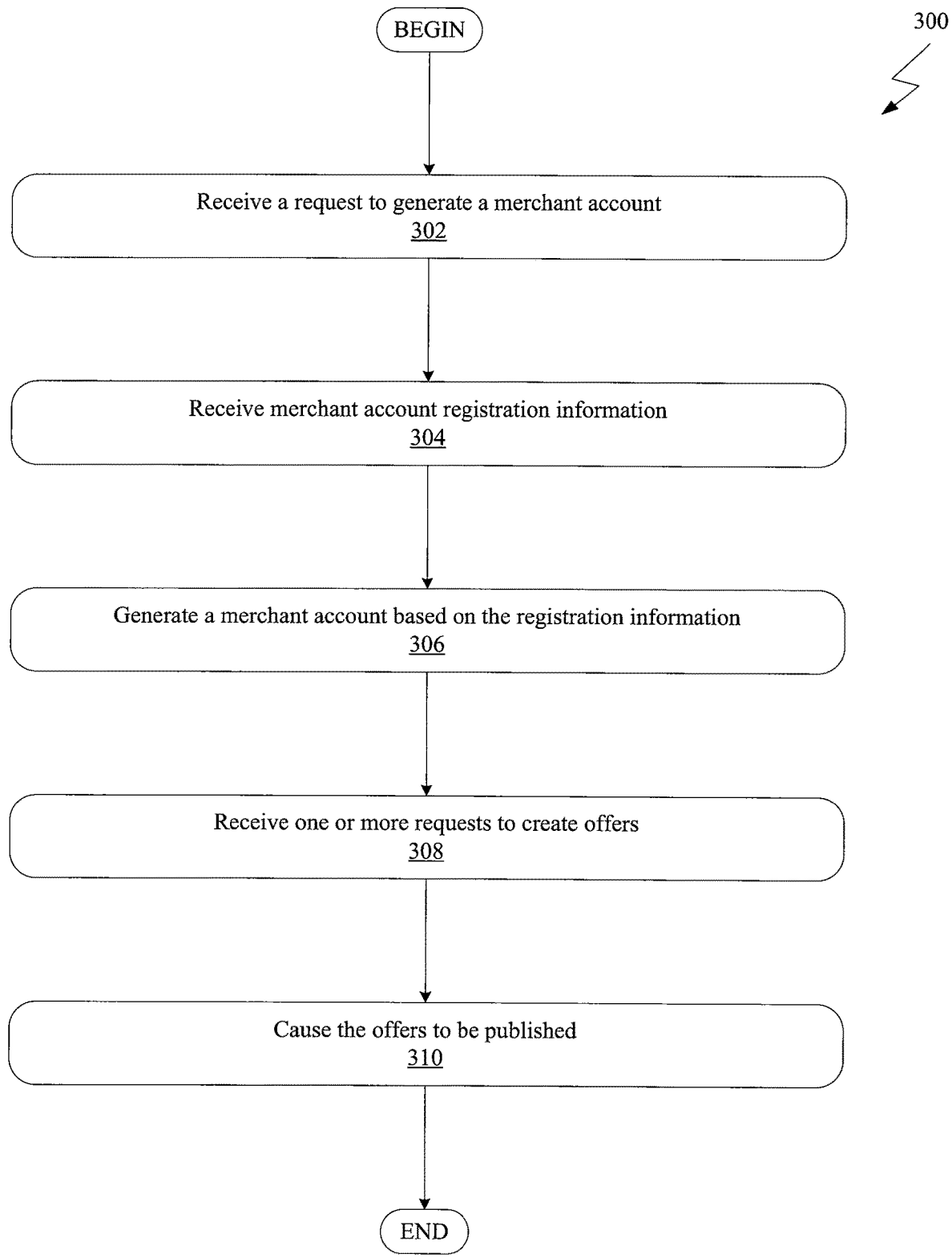
FIG. 3 is a flow diagram of method steps for generating a merchant account, according to one embodiment of the invention.

FIG. 3 is a flow diagram of method steps 300 for generating a merchant account, according to one embodiment of the invention. Persons skilled in the art will understand that, even though method 300 is described in conjunction with FIG. 1, any system configured to perform the method steps, in any order, is within the scope of embodiments of the invention. A merchant account enables merchants to manage offers through interfaces provided by OE 108. As shown, method 300 begins at step 302, where OE 108 receives, e.g., from an administrator of merchant 102, a request to generate a merchant account. For example, the administrator may click a "Sign Up" link found on an interface provided by OE 108 that causes a registration interface to be displayed.

At step 304, OE 108 receives merchant account registration information. Merchant account registration includes, for example, a merchant identification (ID) issued to merchant 102 by the merchant's acquiring bank and/or payment processor 110, where the merchant ID may be used to uniquely identify transactions initiated at merchant 102. POE 110 can filter transaction data processed by payment processor 110 such that POE 110 is able to determine whether accepted offers have been satisfied. As described in further detail below, embodiments of the invention provide a technique for determining a merchant ID of a merchant, since the merchant is sometimes not aware of their own merchant ID, and thus cannot provide this information to the OE 108 at step 304.

At step 306, and in response to receiving the merchant account registration information at step 304, OE 108 generates a merchant account based on the registration information. The merchant account and associated information is stored in database 109.

At step 308, OE 108 receives one or more requests to create offers. Such requests may be generated by merchant 102 via interfaces provided by OE 108 that enable merchant 102 to submit information associated with the offers. For example, the merchant 102 may request an offer that provides a reward of $30.00 cash-back to customers who accept the offer and perform a purchase of $150.00 or more with the merchant in a single transaction any time during the month of July in a given year.

At step 310, OE 108 causes the offers to be published so that they can be accepted by and/or satisfied by one or more customers. In some embodiments, a third-party, other than the OE 108 may publish the offers according to the techniques described above, e.g., web marketing campaigns, email marketing campaigns, etc. For example, merchant 102 may submit, for a particular offer, a list of customer email addresses to which an email that describes the offer should be sent. The offer email received by the customers may include a hyperlink that, when opened by a customer, displays to the customer an offer acceptance form associated with the offer, e.g., offer acceptance form 206.

Figure 4:
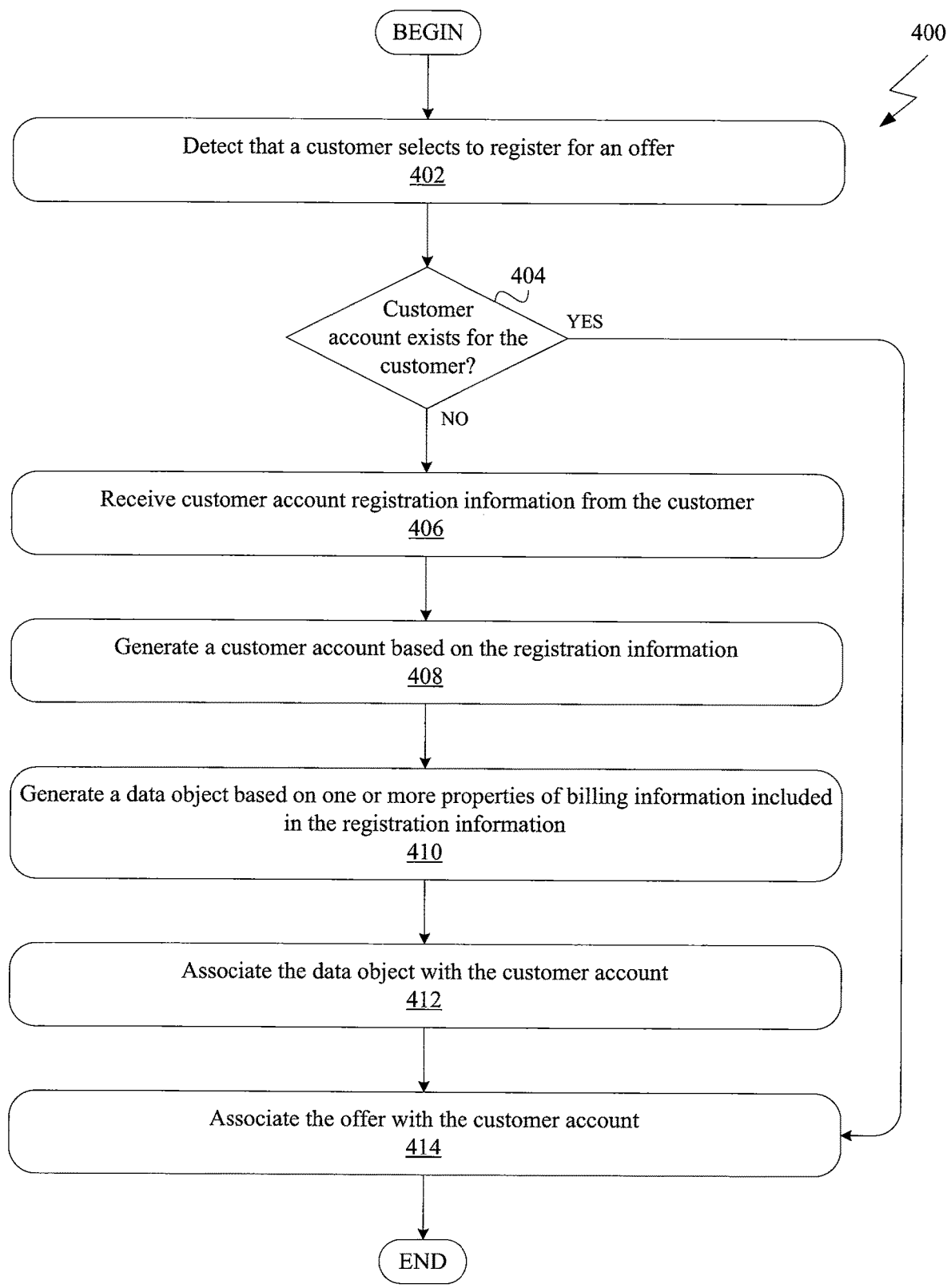
FIG. 4 is a flow diagram of method steps for associating a customer with an offer, according to one embodiment of the invention.

FIG. 4 is a flow diagram of method steps 400 for associating a customer with an offer, according to one embodiment of the invention. Persons skilled in the art will understand that, even though method 400 is described in conjunction with FIG. 1, any system configured to perform the method steps, in any order, is within the scope of embodiments of the invention. As shown, method 400 begins at step 402, where OE 108 detects that a customer selects to register for an offer, e.g., via clicking on offer advertisement widget 202.

At step 404, OE 108 determines whether a customer account exists for the customer. This may be determined according to a variety of techniques, including analysis of browser cookies, internet protocol (IP) addresses, login information, etc., that is accessible to OE 108 and/or provided by the customer. For example, the customer may select a "Sign In" hyperlink included in interface 200 and submit his or her login credentials, whereupon OE 108 references database 109 with the login credentials to determine whether a customer account exists for the customer. If the customer holds an account with OE 108, then OE 108 may display to the customer a list of one or more account numbers registered with the customer's account and previously provided by the customer, and method 400 proceeds to step 414, described below. If the customer does not hold an account with OE 108, then OE 108 displays to the customer input fields that enable him or her to input customer account registration information and accept the offer, and method 400 proceeds to step 406. At step 406, OE 108 receives customer account registration information from the customer, e.g., the customer account registration information described above in conjunction with FIG. 2.

At step 408, OE 108 generates a customer account based on the registration information. The customer account is then stored by OE 108 in database 109. At step 410, OE 108 generates a data object based on one or more properties of billing information included in the registration information. For example, OE 108 may apply a hash function to each account number to generate a corresponding hash value for each account. The hash function is configured to match a hash function executed by payment processor 110 that receives and hashes the account number of the customer when merchant 102 attempts to charge the customer for goods or services. In this way, OE 108 is capable of identifying transactions when reviewing transaction data provided by payment processor 110 and associated with merchant 102 without storing the actual account number, which advantageously decreases overall liability of OE 108 and increases security to the customer. At step 412, OE 108 associates the data object with the customer account.

At step 414, OE 108 associates the offer with the customer account. Thus, OE 108 may subsequently compare offers accepted by the customer with transaction data of merchants associated with the offers to determine whether the offers are satisfied, as described in further detail below in conjunction with FIG. 5.

Figure 5:
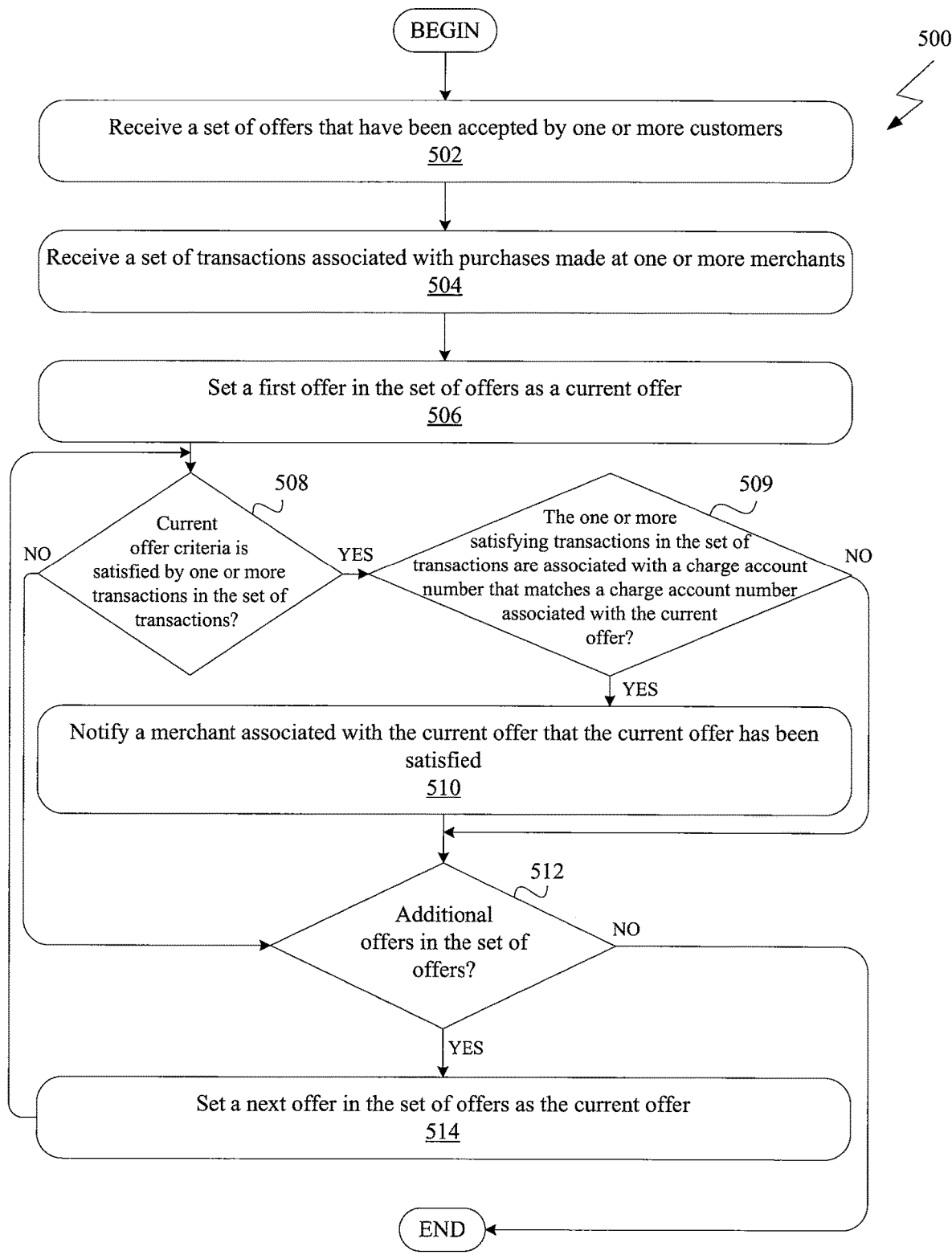
FIG. 5 is a flow diagram of method steps for determining whether a set of offers has been satisfied, according to one embodiment of the invention.

FIG. 5 is a flow diagram of method steps 500 for determining whether a set of offers has been satisfied, according to one embodiment of the invention. Persons skilled in the art will understand that, even though method 500 is described in conjunction with FIG. 1, any system configured to perform the method steps, in any order, is within the scope of embodiments of the invention. As shown, method 500 begins at step 502, where OE 108 receives a set of offers that have been accepted by one or more customers. For example, OE 108 may query database 109 to return a set of offers that have not been marked as expired or satisfied such that only outstanding and/or valid offers are processed.

At step 504, OE 108 receives a set of transactions associated with purchases made at one or more merchants. In one embodiment, OE 108 receives the set of transactions by querying payment processor 110 for particular transactions from one or more merchants. In one example, OE 108 may transmit to payment processor 110 both an ID of a merchant and a set of hashed account numbers associated with customers who have accepted at least one offer with the merchant. In response, payment processor 110 returns transactions that match the hashed account numbers. In another embodiment, a merchant can give the payment processor 110 permission to deliver all transactions from the merchant to a third party, such as OE 108. For example, the transactions can be delivered to the OE 108 periodically (e.g., daily) or in real-time.

At step 506, OE 108 sets a first offer in the set of offers as a current offer. At step 508, OE 108 determines whether criteria of the current offer are satisfied by one or more transactions in the set of transactions. In one embodiment, each offer is associated with executable code that, when executed by OE 108, enables OE 108 to determine whether the current offer has been satisfied by one or more transactions in the set of transactions. For example, if a customer accepts an offer that requires him or her to make an in-store purchase at merchant 102 between the hours of 5:00 PM-6:00 PM, and OE 108 determines from a transaction in the set of transactions that a customer performs a purchase at merchant 102, then OE 108 analyzes timestamp data included the transaction to determine whether the transaction was performed between the required hours.

If, at step 508, OE 108 determines that criteria of the current offer are not satisfied by one or more transactions in the set of transactions, then method 500 proceeds to step 512. Otherwise, at step 509, OE 108 determines whether the one or more transactions identified at step 508 are associated with an account number that matches an account number associated with the current offer. In one embodiment, OE 108 extracts a hashed account number from each transaction and compares the hashed account number against the hashed account number associated with the current offer. If, at step 509, OE 108 determines that the one or more transactions identified at step 508 are not associated with an account number that matches an account number associated with the current offer, then method 500 proceeds to step 512. Otherwise, method 500 proceeds to step 510.

At step 510, OE 108 notifies a merchant associated with the current offer that the current offer has been satisfied. In one embodiment, OE 108 is configured to lookup via database 109 notification preferences of the merchant that is associated with the current offer. For example, OE 108 may determine that the merchant associated with the current offer prefers to receive a daily batch file emailed at the end of each day, where the batch file includes line-by-line detail of each customer who satisfied an offer and the reward that is to be given to them. In addition to notifying the merchant, OE 108 may also be configured to notify the customer associated with the current offer that he or she has satisfied the current offer, as described above in conjunction with FIG. 2.

At step 512, OE 108 determines whether additional offers are in the set of offers. If, at step 512, OE 108 determines that additional offers are in the set of offers, then at step 514, OE 108 sets a next offer in the set of offers as the current offer. In this way, each of the offers in the set of offers are compared against the set of transaction data.

Figure 6:
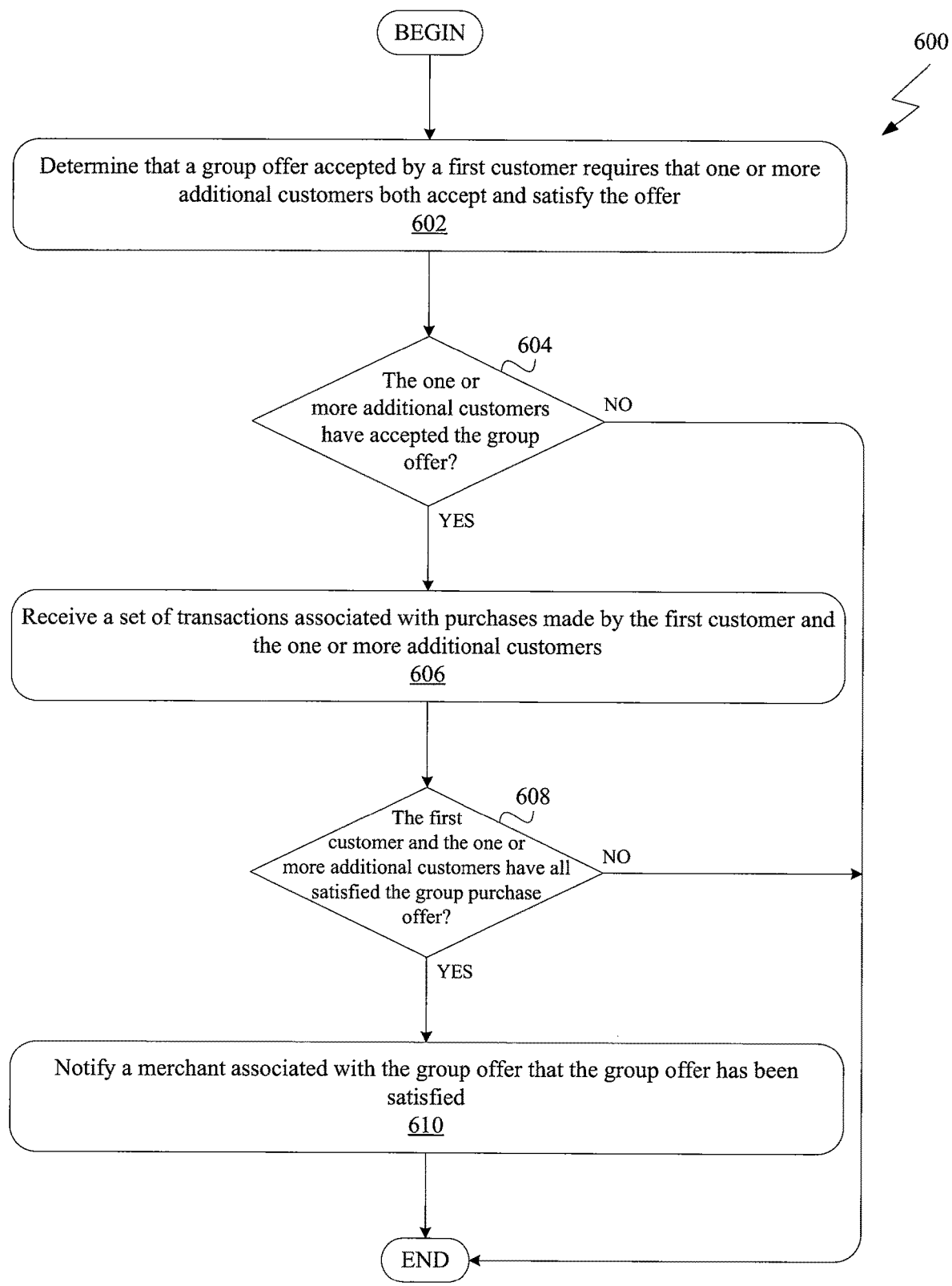
FIG. 6 is a flow diagram of method steps for processing a group offer, according to one embodiment of the invention.

FIG. 6 is a flow diagram of method steps 600 for processing a group offer, according to one embodiment of the invention. Persons skilled in the art will understand that, even though method 600 is described in conjunction with FIG. 1, any system configured to perform the method steps, in any order, is within the scope of embodiments of the invention. As shown, method 600 begins at step 602, where OE 108 determines that a group offer accepted by a first customer requires that one or more additional customers both accept and satisfy the group offer.

At step 604, OE 108 determines whether the one or more additional customers have accepted the group offer. In one example, the first customer accepts a group offer that requires a total of ten or more customers to spend $25.00 or more with merchant 102. In this case, OE 108 parses accepted group offers included in database 109 to determine whether nine or more different customers, in addition to the first customer, have also accepted the group offer.

If, at step 604, OE 108 determines that the one or more additional customers have not accepted the group offer, then the group offer has not been satisfied, and method 600 ends. Otherwise, method 600 proceeds to step 606, where OE 108 receives a set of transactions associated with purchases made by the first customer and the one or more additional customers according to the techniques described above in conjunction with FIG. 2. Alternatively, OE 108 may receive from payment processor 110 a set of all transactions associated with merchant 102 and filter out transactions that are not relevant to the group offer.

At step 608, OE 108 determines whether the first customer and the one or more additional customers have all satisfied the group offer. If, at step 608, OE 108 determines that the first customer and the one or more additional customers have all satisfied the group offer, then method 600 proceeds to step 610, where OE 108 notifies a merchant associated with the group offer that the group offer has been satisfied.

Figure 7:
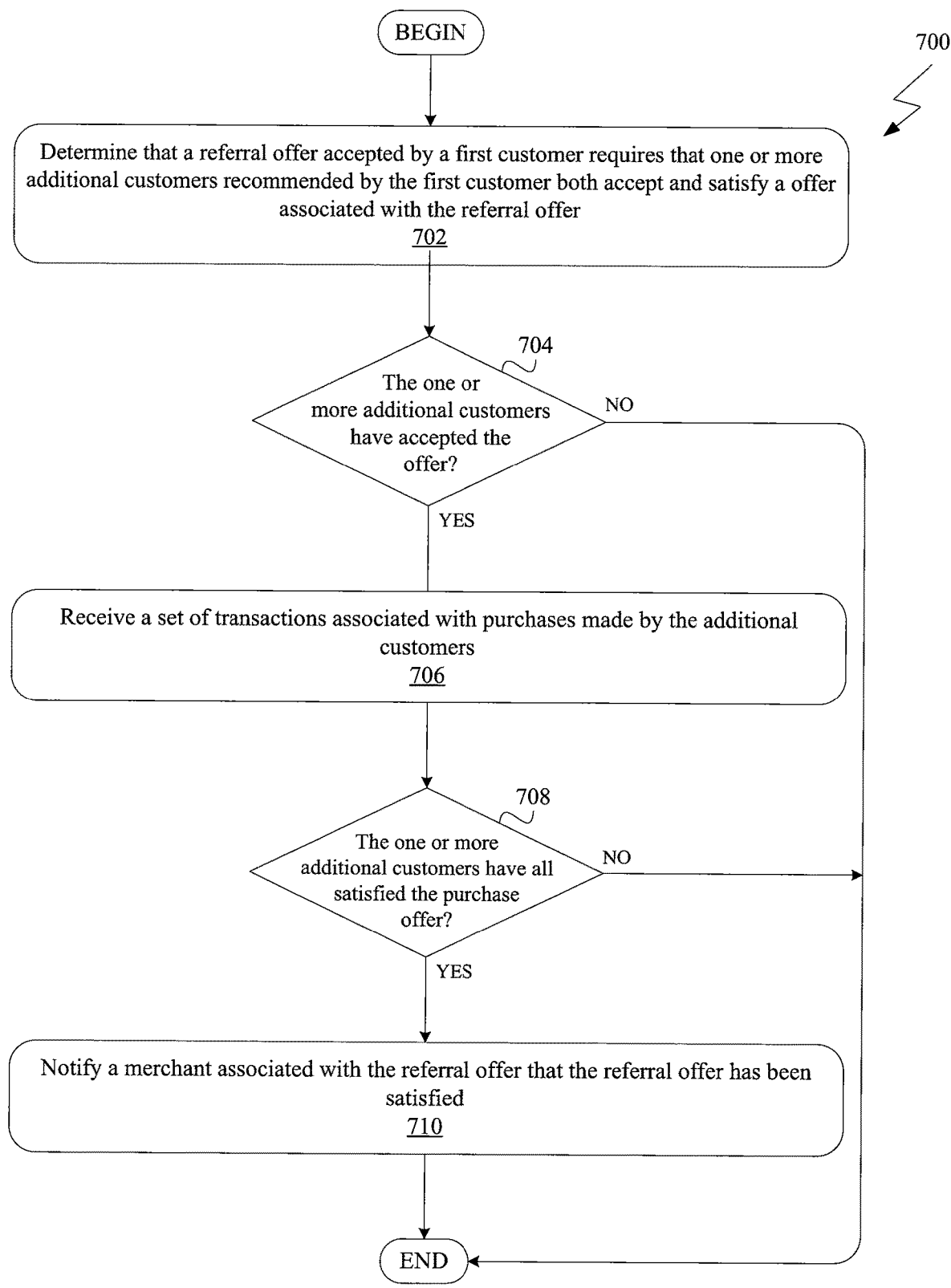
FIG. 7 is a flow diagram of method steps for processing a referral offer, according to one embodiment of the invention.

FIG. 7 is a flow diagram of method steps 700 for processing a referral offer, according to one embodiment of the invention. Persons skilled in the art will understand that, even though method 700 is described in conjunction with FIG. 1, any system configured to perform the method steps, in any order, is within the scope of embodiments of the invention. As shown, method 700 begins at step 702, where OE 108 determines that a referral offer accepted by a first customer requires that one or more additional customers recommended by the first customer both accept and satisfy an offer associated with the referral offer.

In one example, the first customer is exposed to an offer advertisement widget for a referral offer that requires him or her to get additional customers to both accept and satisfy an offer, where the offer requires them to make a purchase of $25.00 or more at merchant 102. Typically, the offer provides incentive to the five or more friends to both accept and satisfy the referral offer, such as $5.00 cash back for making the $25.00 purchase. In turn, the first customer is rewarded $50.00 by merchant 102 when each of the five or more friends both accept and satisfy the offer. The first customer may notify the five friends according to a variety of techniques, such as submitting their email addresses into an interface provided by OE 108, which then delivers a notification of the offer to each email address.

At step 704, OE 108 determines whether the one or more additional customers have accepted the offer. If, at step 704, OE 108 determines that the one or more additional customers have accepted the offer, then method 700 proceeds to step 706, where OE 108 receives a set of transactions associated with purchases made by the additional customers. Otherwise, the referral offer remains outstanding, and method 700 ends.

At step 708, OE 108 determines whether the one or more additional customers have all satisfied the offer. Continuing with the example described above at step 702, OE 108 determines whether each of the five customers have made a purchase of $25.00 or more with merchant 102. If, at step 708, OE 108 determines that the one or more additional customers have all satisfied the offer, then method 700 proceeds to step 710, where notifies a merchant associated with the referral offer that the referral offer has been satisfied.

As described above, OE 108 is configured to manage various types of offers using typical transaction data provided by payment processor 110. Typical transaction data includes properties such as a unique transaction ID, a merchant ID, the customer's card information, a total amount charged, and a timestamp. Though the total amount charged to the customer is included in the transaction data, important data pertaining to the breakdown of the total amount charged—among other more detailed information—is absent from the transaction data, which may be advantageously used by OE 108 to provide offers that are targeted toward, e.g., purchasing specific items from merchant 102.

Such detailed information is often stored in POS system 104 used by merchant 102 to process transactions. In one example, merchant 102 charges a customer $108.00 in total for five $20.00 items purchased, and an 8% sales tax on the total price. As described above in conjunction with FIG. 1, POS system 104 requests payment processor 110 to process the transaction, and payment processor 110 returns to POS system 104 the transaction ID of the transaction if the transaction is successfully processed. In turn, POS system 104 creates in database 109 a new POS transaction object that includes, e.g., a unique POS transaction ID, universal product codes (UPC) codes of each of the five items, product details of each of the five items, a subtotal amount, a tax amount, a total amount, and the transaction ID returned by payment processor 110. Moreover, many POS systems provide application programming interfaces (APIs) that enable administrators to extract transaction data to, e.g., process returns, calculate performance, and the like.

Figure 8:
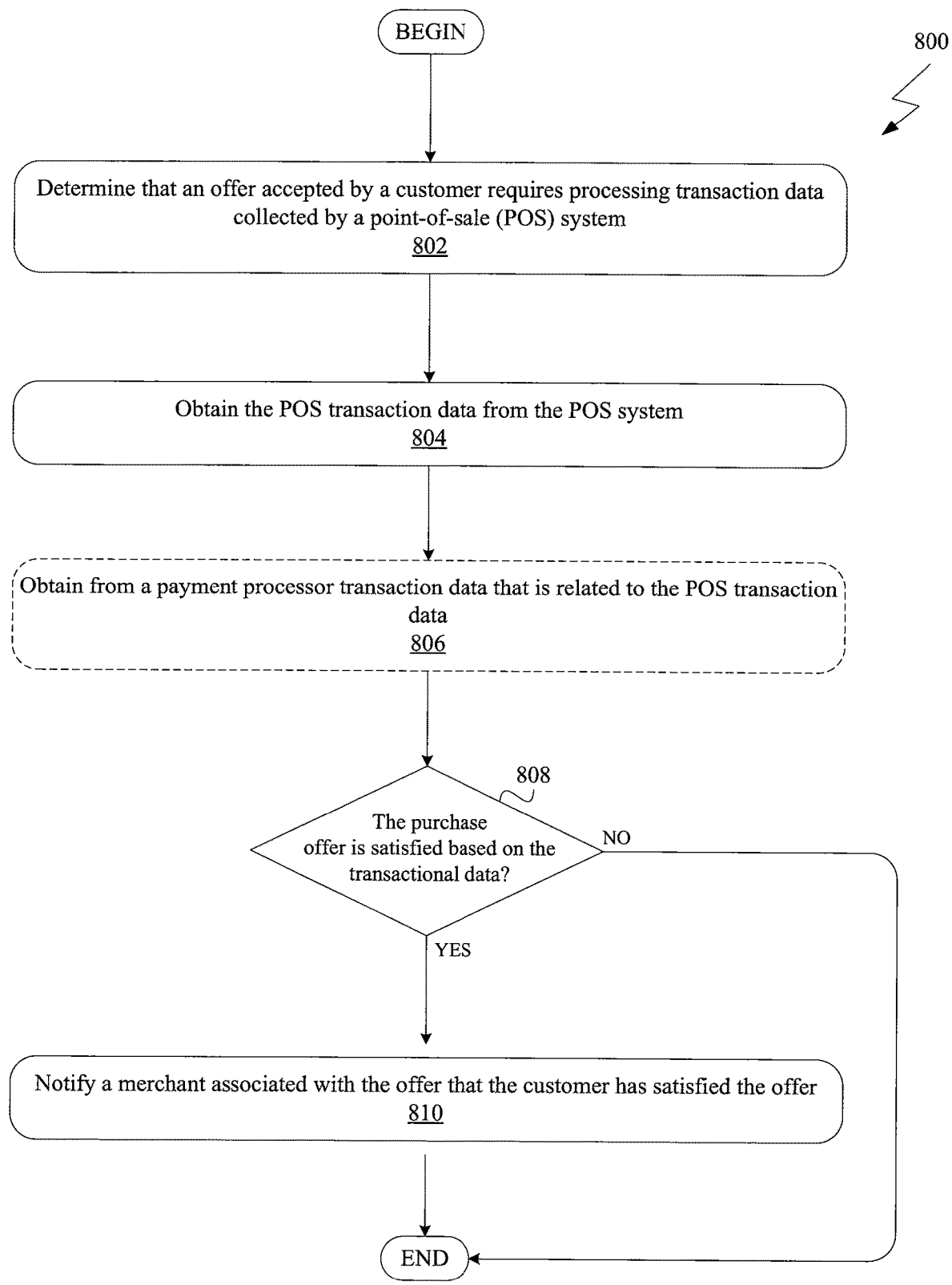
FIG. 8 is a flow diagram of method steps for processing an offer involving specific criteria, according to one embodiment of the invention.

FIG. 8 is a flow diagram of method steps 800 for processing an offer involving specific criteria, according to one embodiment of the invention. Persons skilled in the art will understand that, even though method 800 is described in conjunction with FIG. 1, any system configured to perform the method steps, in any order, is within the scope of embodiments of the invention. As shown, method 800 begins at step 802, where OE 108 determines that an offer accepted by a customer requires processing transactional data collected by a point-of-sale (POS) system, e.g., POS system 104.

At step 804, OE 108 obtains the POS transaction data from POS system 104. In one embodiment, POS system 104 is configured to upload POS transaction data to OE 108 at regular intervals. In another embodiment, POS system 104 is configured to query POS system 104 via an API that provides access to POS system 104 to retrieve the POS transaction data.

Next, the optional step 806 enables OE 108 to verify that the purchase did in fact take place and that no corruption of POS system 104 has occurred. More specifically, at step 806, OE 108 optionally obtains from a payment processor, e.g., payment processor 110, transaction data that is related to the POS transaction data. In one example, OE 108 extracts the transaction ID from the POS transaction data which, as described above, is returned by payment processor 110 for each transaction that is successfully processed. OE 108 then queries payment processor 110 for a transaction that matches the transaction ID. If payment processor 110 returns a transaction based on the transaction ID, then OE 108 verifies that the POS transaction data obtained from POS system 104 is not corrupt. Otherwise, OE 108 may notify merchant 102 of the discrepancy.

At step 808, OE 108 determines whether the offer is satisfied based on the transactional data. In one example, the offer requires that the customer purchases a medium-sized black T-Shirt to receive a $2.00 reward. OE 108 then, according to the techniques described above in conjunction with FIG. 5, processes the POS transaction data to determine whether the offer has in fact been satisfied. For example, the POS transaction data may include a "Description" field with a value "Size:M;Color:Blk" that OE 108 is able to parse and identify as a purchase that satisfies the offer. In another example, merchant 102 may provide a UPC code associated with medium-sized black T-Shirts to OE 108 when creating the offer such that OE 108 need only verify that UPC code included in the POS transaction data is valid.

If, at step 808, OE 108 determines that the offer is not satisfied based on the transactional data, then the method 800 ends. Otherwise, the method 800 proceeds to step 810, where the OE 108 notifies merchant 102 associated with the offer that the customer has satisfied the offer.

Figure 9:
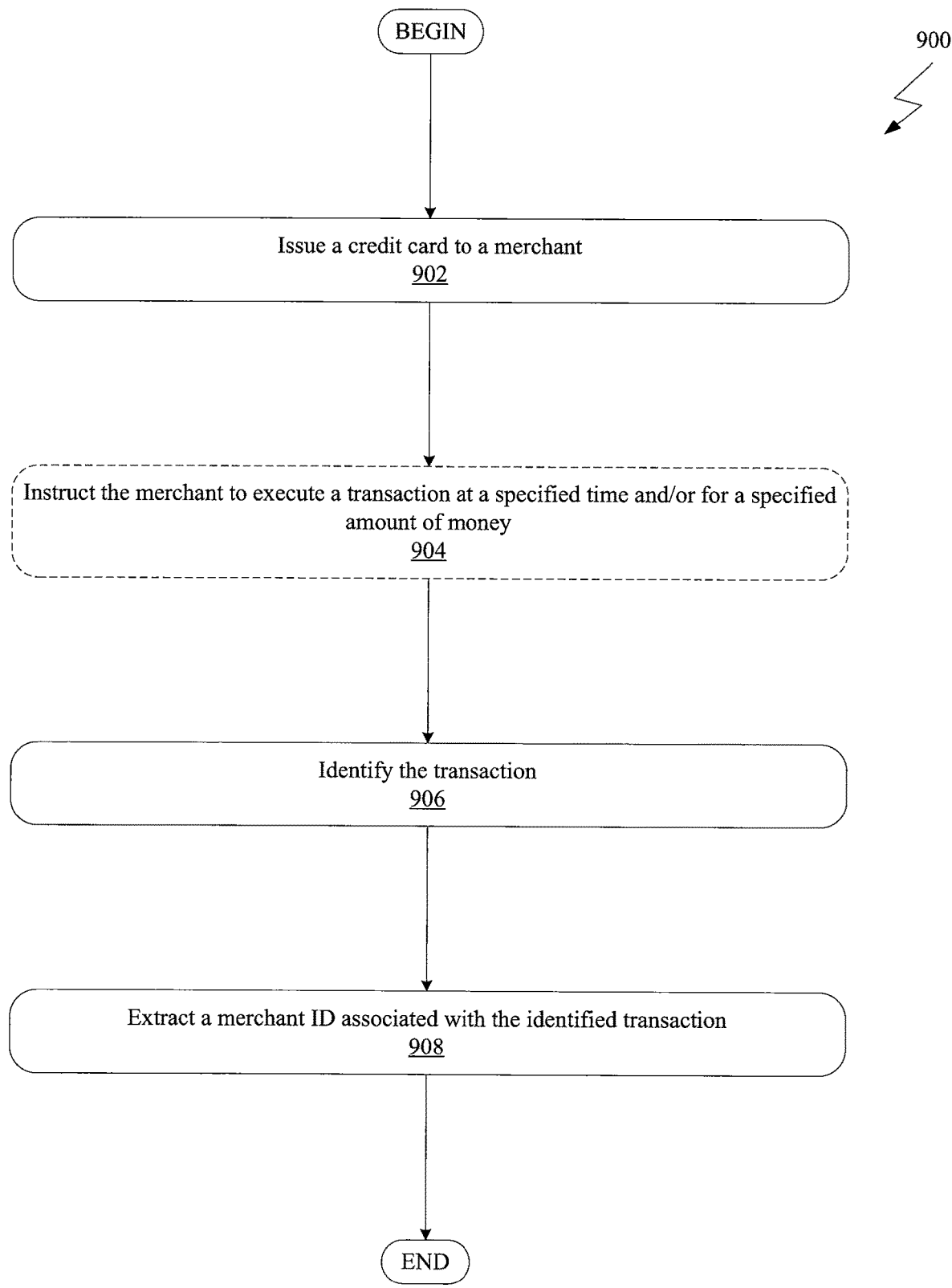
FIG. 9 is a flow diagram of method steps for extracting an identification (ID) of a merchant, according to one embodiment of the invention.

FIG. 9 is a flow diagram of method steps 900 for extracting an identification (ID) of a merchant, according to one embodiment of the invention. Persons skilled in the art will understand that, even though method 900 is described in conjunction with FIG. 1, any system configured to perform the method steps, in any order, is within the scope of embodiments of the invention. In the method 900, OE 108 is configured to act as an issuing bank. More specifically, OE 108 is configured to issue one or more pre-paid credit cards that are distributed to merchants who are unaware of their merchant ID, which is a typical problem. When charges are attempted on such cards, OE 108 receives a transaction request because the OE 108 is the issuer of the card. The transaction received by the OE 108 includes at least a merchant ID of the merchant that is attempting to charge the card. The transaction may also include a date/time that the transaction was generated and amount associated therewith.

As shown, method 900 begins at step 902, where OE 108 issues a credit card to a merchant. OE 108 also maintains a hash of the numbers included on the credit card according to the hashing techniques described above in conjunction with FIG. 4 such that comparisons can be made in a secure manner.

At step 904, OE 108 instructs merchant 102 to execute a transaction at a specified time and/or for a specified amount of money. In one example, merchant 102 is instructed by OE 108 to attempt a charge for $11,302.34 on Jan. 23, 2011 between the hours of 3:00 PM and 4:00 PM.

At step 906, OE 108 identifies the transaction. In one embodiment, OE 108 is configured to automatically identify the transaction when a request for the transaction is received. In another embodiment, OE 108 is configured to parse a set of transactions, e.g., at the end of each day, to identify the transaction. At step 908, OE 108 extracts a merchant ID associated with the identified transaction. In turn, the merchant ID may be used to register a merchant account, as described above in conjunction with FIG. 3. In some embodiments, the OE 108 may then decline the transaction so that no funds are actually transferred between financial institutions.

Advantageously, embodiments of the invention provide an improved technique for monitoring for offline transactions. A customer accepts an offer provided by a merchant and submits his or her account information so that he or she may receive a reward for satisfying criteria associated with the offer. Transactions of the merchant are then monitored to determine whether the customer satisfies the purchase criteria. As a result, the merchant is able to determine the overall effectiveness of advertising campaigns by analyzing the number of offers that are both accepted and satisfied.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method for measuring conversion of an online advertising campaign for an offline merchant by communicating with a payment processing system that facilitates electronic payment transactions between the offline merchant and customers of the offline merchant to determine completion of conversion transactions between respective customers and the offline merchant in response to the respective customers receiving and accepting an online group offer from the offline merchant via a plurality of webpage offer advertisement widgets on respective web pages, each webpage offer advertisement widget including offer data for the online offer and being rendered by web browsers coupled to the Internet and used by the respective customers to view the plurality of webpage offer advertisement widgets, wherein the offer data for the online group offer specifies at least one criterion for the respective customers to satisfy the online group offer and thereby complete the conversion transactions with the offline merchant, the method comprising:

storing, by an offer engine coupled to the Internet, offer information for the online group offer, wherein the offer information includes:
  a merchant identifier of the offline merchant, the merchant identifier being issued to the offline merchant by the payment processor or an acquiring bank of the merchant to uniquely identify the electronic payment transactions between the offline merchant and the customers of the offline merchant; and
  the offer data specifying the at least one criterion for the respective customers to satisfy the online group offer;

determining, by the offer engine, that a first customer of the respective customers viewing a first webpage offer advertisement widget including the online group offer via a first web browser clicked on the first webpage offer advertisement widget including the online group offer;

in response to the first customer clicking on the first webpage offer advertisement widget including the online offer, providing, by the offer engine via the Internet, an interface including an offer acceptance form for display on the first web browser of the first customer to register a first customer account with the offer engine to accept the online group offer;

receiving, by the offer engine via the Internet, and in response to providing the interface including the offer acceptance form to register the first customer account, a first payment account number of a first payment account for the first customer, wherein the first payment account includes at least one of a first customer credit card, a first customer debit card, and a first customer prepaid card;

determining, by the offer engine, that a second customer of the respective customers viewing the webpage advertisement including the online group offer via a second web browser clicked on the webpage advertisement including the online group offer;

providing, by the offer engine via the Internet, the interface for display on the second web browser of the second customer to register a second customer account with the offer engine to accept the online group offer;

receiving, by the offer engine via the Internet, in response to providing the interface to register the second customer account a second payment account number of a second payment account for the second customer, wherein the second payment account includes at least one of a second customer credit card, a second customer debit card, and a second customer prepaid card;

transmitting a query to the payment processor, by the offer engine via the Internet, for a plurality of offline transactions for in-store purchases at one or more brick-and-mortar locations of the offline merchant, wherein the transmitted query includes the merchant identifier issued to the offline merchant by the payment processor or the acquiring bank of the merchant to uniquely identify the electronic payment transactions between the offline merchant and the customers of the offline merchant;

receiving the plurality of offline transactions from the payment processor in response to the query including the merchant identifier transmitted by the offer engine via the Internet, wherein the plurality of offline transactions received by the offer engine from the payment processor do not include an identification of the online group offer; and determining, by the offer engine based on the plurality of offline transactions received from the payment processor and the at least one criterion specified by the online group offer in the stored offer information, whether the first customer has completed a first conversion transaction and the second customer has completed a second conversion transaction corresponding to the online group offer by:

determining if the at least one criterion specified by the online group offer is satisfied in at least two offline transactions of the plurality of offline transactions received from the payment processor; and for each offline transaction of the at least two offline transactions in which the at least one criterion specified by the online offer is satisfied:

determining if one offline transaction of the at least two offline transactions is the first conversion transaction completed by the first customer, based at least in part on the first payment account number of the first payment account for the first customer received by the offer engine via the Internet in response to providing the interface including the offer acceptance form to register the first customer account to accept the online group offer;

determining if another offline transaction of the at least two offline transactions is the second conversion transaction completed by the second customer, based at least in part on the second payment account number of the second payment account for the second customer received by the offer engine via the Internet in response to providing the interface to register the second customer account to accept the online group offer.

2. The method of claim 1, wherein determining, by the offer engine, that the first customer clicked on the webpage advertisement including the online group offer comprises:
determining, via at least one of a browser cookie and Internet Protocol (IP) address tracking, that the first customer clicked on the webpage advertisement.

3. The method of claim 1, wherein determining whether the first customer has completed the first conversion transaction corresponding to the online group offer comprises:
determining whether the first customer performed an action comprising at least one of:
purchasing a certain quantity of a good or service,
spending a certain amount in a particular purchase,
making a purchase at a particular time, or
making a number of purchases within a particular amount of time.

4. The method of claim 1, wherein determining if the one offline transaction of the at least two offline transactions is the first conversion transaction completed by the first customer further comprises:
extracting, by the offer engine, a first hashed transaction payment account number included in the one offline transaction;
comparing the extracted first hashed transaction payment account number against a first hashed account number corresponding to the first payment account number of the first payment account for the first customer received by the offer engine via the Internet in response to providing the interface to register the first customer account; and
determining that the first customer has completed the first conversion transaction corresponding to the online group offer if the extracted first hashed transaction payment account number matches the first hashed account number corresponding to the first payment account number of the first payment account for the first customer.

5. The method of claim 4, wherein determining if the other offline transaction of the at least two offline transactions is the second conversion transaction completed by the second customer further comprises:
extracting, by the offer engine, a second hashed transaction payment account number included in the other offline transaction;
comparing the extracted second hashed transaction payment account number against a second hashed account number corresponding to the second payment account number of the second payment account for the second customer received by the offer engine via the Internet in response to providing the interface to register the second customer account; and
determining that the second customer has completed the second conversion transaction corresponding to the online group offer if the extracted second hashed transaction payment account number matches the second hashed account number corresponding to the second payment account number of the second payment account for the second customer.

6. The method of claim 5, wherein:
determining, by the offer engine, that the first customer and the second customer clicked on the webpage advertisement including the online group offer comprises determining, via at least one of a browser cookie and Internet Protocol (IP) address tracking, that the first customer and the second customer clicked on the webpage advertisement.

7. The method of claim 6, wherein determining whether the first customer has completed the first conversion transaction and the second customer has completed the second conversion transaction corresponding to the online group offer comprises:
   determining whether the first customer and the second customer performed respective actions comprising at least one of:
   purchasing a certain quantity of a good or service,
   spending a certain amount in a particular purchase,
   making a purchase at a particular time, or
   making a number of purchases within a particular amount of time.

8. The method of claim 1, wherein the plurality of offline transactions are compiled for the payment processor by one or more of:
   a merchant system of the offline merchant;
   a first payment card issuer that issues the at least one of the first customer credit card, the first customer debit card, and the first customer prepaid card to the first customer;
   a second payment card issuer that issues the at least one of the second customer credit card, the second customer debit card, and the second customer prepaid card to the second customer;
   a payment processor system that processes the plurality of offline transactions;
   a point of sale system that processes the plurality of offline transactions; or
   a financial institution that maintains financial funds for at least one of the first customer, the second customer or the offline merchant.

9. A non-transitory computer-readable medium storing instructions that, when executed by one or more processors, perform a method for measuring conversion of an online advertising campaign for an offline merchant by communicating with a payment processing system that facilitates electronic payment transactions between the offline merchant and customers of the offline merchant to determine completion of conversion transactions between respective customers and the offline merchant in response to the respective customers receiving and accepting an online group offer from the offline merchant via a plurality of webpage offer advertisement widgets on respective web pages, each webpage offer advertisement widget including offer data for the online offer and being rendered by web browsers coupled to the Internet and used by the respective customers to view the plurality of webpage offer advertisement widgets, wherein the offer data for the online group offer specifies at least one criterion for the respective customers to satisfy the online group offer and thereby complete the conversion transactions with the offline merchant, the method comprising:
   storing, by an offer engine coupled to the Internet, offer information for the online group offer, wherein the offer information includes:
      a merchant identifier of the offline merchant, the merchant identifier being issued to the offline merchant by the payment processor or an acquiring bank of the merchant to uniquely identify the electronic payment transactions between the offline merchant and the customers of the offline merchant; and
      the offer data specifying the at least one criterion for the respective customers to satisfy the online group offer;
   determining, by the offer engine, that a first customer of the respective customers viewing a first webpage offer advertisement widget including the online group offer via a first web browser clicked on the first webpage offer advertisement widget including the online group offer;
   in response to the first customer clicking on the first webpage offer advertisement widget including the online offer, providing, by the offer engine via the Internet, an interface including an offer acceptance form for display on the first web browser of the first customer to register a first customer account with the offer engine to accept the online group offer;
   receiving, by the offer engine via the Internet, and in response to providing the interface including the offer acceptance form to register the first customer account, a first payment account number of a first payment account for the first customer, wherein the first payment account includes at least one of a first customer credit card, a first customer debit card, and a first customer prepaid card;
   determining, by the offer engine, that a second customer of the respective customers viewing the webpage advertisement including the online group offer via a second web browser clicked on the webpage advertisement including the online group offer;
   providing, by the offer engine via the Internet, an interface for display on the second web browser of the second customer to register a second customer account with the offer engine to accept the online group offer;
   receiving, by the offer engine via the Internet, in response to providing the interface to register the second customer account, a second payment account number of a second payment account for the second customer, wherein the second payment account includes at least one of a second customer credit card, a second customer debit card, and a second customer prepaid card;
   transmitting a query to the payment processor, by the offer engine via the Internet, for a plurality of offline transactions for in-store purchases at one or more brick-and-mortar locations of the offline merchant, wherein the transmitted query includes the merchant identifier issued to the offline merchant by the payment processor or the acquiring bank of the merchant to uniquely identify the electronic payment transactions between the offline merchant and the customers of the offline merchant;
   receiving the plurality of offline transactions from the payment processor in response to the query including the merchant identifier transmitted by the offer engine via the Internet, wherein the plurality of offline transactions received by the offer engine from the payment processor do not include an identification of the online group offer; and
   determining, by the offer engine based on the plurality of offline transactions received from the payment processor and the at least one criterion specified by the online group offer in the stored offer information, whether the first customer has completed a first conversion transaction and the second customer has completed a second conversion transaction corresponding to the online group offer by:
      determining if the at least one criterion specified by the online group offer is satisfied in at least two offline transactions of the plurality of offline transactions received from the payment processor; and
      for each offline transaction of the at least two offline transactions in which the at least one criterion specified by the online offer is satisfied:

determining if one offline transaction of the at least two offline transactions is the first conversion transaction completed by the first customer, based at least in part on the first payment account number of the first payment account for the first customer received by the offer engine via the Internet in response to providing the interface including the offer acceptance form to register the first customer account to accept the online group offer determining if another offline transaction of the at least two offline transactions is the second conversion transaction completed by the second customer, based at least in part on the second payment account number of the second payment account for the second customer received by the offer engine via the Internet in response to providing the interface to register the second customer account to accept the online group offer.

10. The computer readable medium of claim 9, wherein in the method, determining by the offer engine that the first customer clicked on the webpage advertisement including the online group offer comprises:

determining, via at least one of a browser cookie and Internet Protocol (IP) address tracking, that the first customer clicked on the webpage advertisement.

11. The computer readable medium of claim 9, wherein in the method, determining whether the first customer has completed the first conversion transaction corresponding to the online group offer comprises:

determining whether the first customer performed an action comprising at least one of:
purchasing a certain quantity of a good or service,
spending a certain amount in a particular purchase,
making a purchase at a particular time, or
making a number of purchases within a particular amount of time.

12. The computer readable medium of claim 9, wherein in the method, determining if the one offline transaction of the at least two offline transactions is the first conversion transaction completed by the first customer further comprises:

extracting, by the offer engine, a first hashed transaction payment account number included in the one offline transaction;

comparing the extracted first hashed transaction payment account number against a first hashed account number corresponding to the first payment account number of the first payment account for the first customer received by the offer engine via the Internet in response to providing the interface to register the first customer account; and determining that the first customer has completed the first conversion transaction corresponding to the online group offer if the extracted first hashed transaction payment account number matches the first hashed account number corresponding to the first payment account number of the first payment account for the first customer.

13. The computer readable medium of claim 12, wherein in the method, determining if the other offline transaction of the at least two offline transactions is the second conversion transaction completed by the second customer further comprises:

extracting, by the offer engine, a second hashed transaction payment account number included in the other offline transaction;

comparing the extracted second hashed transaction payment account number against a second hashed account number corresponding to the second payment account number of the second payment account for the second customer received by the offer engine via the Internet in response to providing the interface to register the second customer account; and determining that the second customer has completed the second conversion transaction corresponding to the online group offer if the extracted second hashed transaction payment account number matches the second hashed account number corresponding to the second payment account number of the second payment account for the second customer.

14. The computer readable medium of claim 13, wherein in the method, determining by the offer engine that the first customer and the second customer clicked on the webpage advertisement including the online group offer comprises:

determining, via at least one of a browser cookie and Internet Protocol (IP) address tracking, that the first customer and the second customer clicked on the webpage advertisement.

15. The computer readable medium of claim 14, wherein in the method, determining whether the first customer has completed the first conversion transaction and the second customer has completed the second conversion transaction corresponding to the online group offer comprises:

determining whether the first customer and the second customer performed respective actions comprising at least one of:
purchasing a certain quantity of a good or service,
spending a certain amount in a particular purchase,
making a purchase at a particular time, or
making a number of purchases within a particular amount of time.

16. The computer readable medium of claim 9, wherein the plurality of offline transactions are compiled for the payment processor by one or more of:

a merchant system of the offline merchant;
a first payment card issuer that issues the at least one of the first customer credit card, the first customer debit card, and the first customer prepaid card to the first customer;
a second payment card issuer that issues the at least one of the second customer credit card, the second customer debit card, and the second customer prepaid card to the second customer;
a payment processor system that processes the plurality of offline transactions;
a point of sale system that processes the plurality of offline transactions; or
a financial institution that maintains financial funds for at least one of the first customer, the second customer or the offline merchant.

17. A system to measure conversion of an online advertising campaign for an offline merchant by communicating with a payment processing system that facilitates electronic payment transactions between the offline merchant and customers of the offline merchant to determine completion of conversion transactions between respective customers and the offline merchant in response to the respective customers receiving and accepting an online group offer from the offline merchant via a plurality of webpage offer advertisement widgets on respective web pages, each webpage offer advertisement widget including offer data for the online offer and being rendered by web browsers coupled to the Internet and used by the respective customers to view the plurality of webpage offer advertisement widgets, wherein the offer data for the online group offer specifies at least one criterion for the respective customers to satisfy the online group offer and thereby complete the conversion transactions with the offline merchant, the system comprising:
 a computer processor; and
 a memory to store instructions that are executable by the computer processor to cause the processor to:
 store offer information for the online group offer, wherein the offer information includes:
  a merchant identifier of the offline merchant, the merchant identifier being issued to the offline merchant by the payment processor or an acquiring bank of the merchant to uniquely identify the electronic payment transactions between the offline merchant and the customers of the offline merchant; and
 the offer data specifying the at least one criterion for the respective customers to satisfy the online group offer;
 determine that a first customer of the respective customers viewing a first webpage offer advertisement widget including the online group offer via a first web browser clicked on the first webpage offer advertisement widget including the online group offer;
 in response to the first customer clicking on the first webpage offer advertisement widget including the online offer, provide, via the Internet, an interface including an offer acceptance form for display on the first web browser of the first customer to register a first customer account with the offer engine to accept the online group offer;
 receive via the Internet, and in response to providing the interface including the offer acceptance form to register the first customer account, a first payment account number of a first payment account for the first customer, wherein the first payment account includes at least one of a first customer credit card, a first customer debit card, and a first customer prepaid card;
 determine that a second customer of the respective customers viewing the webpage advertisement including the online group offer via a second web browser clicked on the webpage advertisement including the online group offer;
 provide, via the Internet, an interface for display on the second web browser of the second customer to register a second customer account with the offer engine to accept the online group offer;
 receive via the Internet, in response to providing the interface to register the second customer account, a second payment account number of a second payment account for the second customer, wherein the second payment account includes at least one of a second customer credit card, a second customer debit card, and a second customer prepaid card;
 transmit, via the Internet, a query to a payment processor for a plurality of offline transactions for in-store purchases at one or more brick-and-mortar locations of the offline merchant, wherein the transmitted query includes the merchant identifier issued to the offline merchant by the payment processor or the acquiring bank of the merchant to uniquely identify the electronic payment transactions between the offline merchant and the customers of the offline merchant;
 receive the plurality of offline transactions from the payment processor in response to the query including the merchant identifier transmitted via the Internet, wherein the plurality of offline transactions received by the offer engine from the payment processor do not include an identification of the online group offer; and
 determine, based on the plurality of offline transactions received from the payment processor and the at least one criterion specified by the online group offer in the stored offer information, whether the first customer has completed a first conversion transaction and the second customer has completed a second conversion transaction corresponding to the online group offer by:
  determining if the at least one criterion specified by the online group offer is satisfied in at least two offline transactions of the plurality of offline transactions received from the payment processor; and
  for each offline transaction of the at least two offline transactions in which the at least one criterion specified by the online group offer is satisfied:
   determining if one offline transaction of the at least two offline transactions is the first conversion transaction completed by the first customer, based at least in part on the first payment account number of the first payment account for the first customer received by the offer engine via the Internet in response to providing the interface including the offer acceptance form to register the first customer account to accept the online group offer;
   determining if another offline transaction of the at least two offline transactions is the second conversion transaction completed by the second customer, based at least in part on the second payment account number of the second payment account for the second customer received by the offer engine via the Internet in response to providing the interface to register the second customer account to accept the online group offer.

18. The system of claim 17, wherein in determining that the first customer clicked on the webpage advertisement including the online group offer, the instructions further cause the computer processor to:
 determine, via at least one of a browser cookie and Internet Protocol (IP) address tracking, that the first customer clicked on the webpage advertisement.

19. The system of claim 17, wherein in determining whether the first customer has completed the first conversion transaction corresponding to the online offer, the instructions further cause the computer processor to:
 determine whether the first customer performed an action comprising at least one of:
  purchasing a certain quantity of a good or service,
  spending a certain amount in a particular purchase,
  making a purchase at a particular time, or
  making a number of purchases within a particular amount of time.

20. The system of claim 17, wherein in determining if the one offline transaction of the at least two offline transactions is the first conversion transaction completed by the first customer, the instruction further cause the computer processor to:
 extract a first hashed transaction payment account number included in the one offline transaction;
 compare the extracted first hashed transaction payment account number against a first hashed account number corresponding to the first payment account number of the first payment account for the first customer received via the Internet in response to providing the interface to register the first customer account; and determine that the first customer has completed the first conversion transaction corresponding to the online group offer if the extracted first hashed transaction payment account number matches the first hashed account number corresponding to the first payment account number of the first payment account for the first customer.

21. The system of claim 20, wherein in determining if the other offline transaction of the at least two offline transactions is the second conversion transaction completed by the second customer, the instruction further cause the computer processor to:

extract a second hashed transaction payment account number included in the other offline transaction;

compare the extracted second hashed transaction payment account number against a second hashed account number corresponding to the second payment account number of the second payment account for the second customer received via the Internet in response to providing the interface to register the second customer account; and determine that the second customer has completed the second conversion transaction corresponding to the online group offer if the extracted second hashed transaction payment account number matches the second hashed account number corresponding to the second payment account number of the second payment account for the second customer.

22. The system of claim 21, wherein in determining that the first customer and the second customer clicked on the webpage advertisement including the online group offer, the instructions further cause the computer processor to:

determine, via at least one of a browser cookie and Internet Protocol (IP) address tracking, that the first customer and the second customer clicked on the webpage advertisement.

23. The system of claim 22, wherein in determining whether the first customer has completed the first conversion transaction and the second customer has completed the second conversion transaction corresponding to the online offer, the instructions further cause the computer processor to:

determine whether the first customer and the second customer performed respective actions comprising at least one of:
purchasing a certain quantity of a good or service,
spending a certain amount in a particular purchase,
making a purchase at a particular time, or
making a number of purchases within a particular amount of time.

24. The system of claim 17, wherein the one or more offline transactions are compiled for the payment processor by one or more of:
a merchant system of the offline merchant;
a first payment card issuer that issues the at least one of the first customer credit card, the first customer debit card, and the first customer prepaid card to the first customer;
a second payment card issuer that issues the at least one of the second customer credit card, the second customer debit card, and the second customer prepaid card to the second customer;
a payment processor system that processes the plurality of offline transactions;
a point of sale system that processes the plurality of offline transactions; or
a financial institution that maintains financial funds for at least one of the first customer, the second customer or the offline merchant.

* * * * *